United States Patent
Yokoyama et al.

(10) Patent No.: US 6,965,222 B2
(45) Date of Patent: Nov. 15, 2005

(54) CURRENT CONTROLLER FOR INDUCTIVE LOAD

(75) Inventors: Nobuaki Yokoyama, Tokyo (JP); Minoru Abe, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 66 days.

(21) Appl. No.: 10/782,859

(22) Filed: Feb. 23, 2004

(65) Prior Publication Data

US 2004/0178782 A1    Sep. 16, 2004

(30) Foreign Application Priority Data

Mar. 10, 2003   (JP) .............................. 2003-063083

(51) Int. Cl.[7] .............................................. G05F 1/40
(52) U.S. Cl. ...................... 323/284; 323/275; 323/283
(58) Field of Search ................................ 323/241, 246, 323/268, 274, 275, 277, 283, 284, 285, 290

(56) References Cited

U.S. PATENT DOCUMENTS 4,930,040 A  *  5/1990  Binarsch et al. ............. 323/287
6,400,106 B1 *  6/2002  Magruder et al. ........... 323/268

FOREIGN PATENT DOCUMENTS

JP          61-164515 U      10/1986
JP          3030076 B2        6/1992

* cited by examiner

*Primary Examiner*—Jessica Han
(74) *Attorney, Agent, or Firm*—Sughrue Mion, PLLC (57) ABSTRACT

A current controller includes a pulse width modulation signal outputting circuit, a saw-tooth-wave signal generating circuit, a command value smoothing circuit, a detection value amplifying circuit, a deviation integrating circuit, and a current controlling circuit. The current controlling circuit controls a current caused to flow through a solenoid on the basis of a saw-tooth-wave signal having the same period as that of a pulse width modulation signal, and a detection signal generated by the deviation integrating circuit.

9 Claims, 4 Drawing Sheets

CURRENT CONTROLLER FOR INDUCTIVE LOAD

BACKGROUND OF THE INVENTION

1. Field of the Invention

The present invention relates to a current controller for controlling a current caused to flow through an inductive load such as a solenoid.

2. Description of the Related Art

As described in JP 3,030,076 B for example, a conventional current controller is configured so that an output signal of a smoothing means and an output signal of a holding means are compared with each other, and ON/OFF control of a switching means for controlling a driving current caused to flow through an electromagnet is carried out on the basis of the comparison results, whereby even if a power supply voltage or a coil resistance of an actuator is changed, a fixed mean current can be obtained.

However, in the conventional current controller, since a peak holding amplifier as the smoothing means detects a current caused to flow through a coil to thereby correct a time period of an ON state of a power transistor as the switching means, the peak holding amplifier can not accurately detect the current caused to flow through the coil in correspondence to a change in ratio between a turn-ON time period and a turn-OFF time period of a power transistor. Consequently, there is a fixed limit to the accuracy for current control.

SUMMARY OF THE INVENTION

In the light of the foregoing, the present invention has been made in order to solve the above-mentioned problems associated with the prior art, and it is, therefore, an object of the present invention to provide a current controller for an inductive load which is capable of enhancing accuracy for current control.

According to the present invention, there is provided a current controller for an inductive load including: a pulse width modulation signal outputting circuit; a saw-tooth-wave signal generating circuit; a command value smoothing circuit; a deviation integrating circuit; and a current controlling circuit. The pulse width modulation signal outputting circuit outputs a pulse width modulation signal For setting a current caused to flow through the inductive load is set to a target current. The saw-tooth-wave signal generating circuit generates a saw-tooth-wave signal having the same period as that of the pulse width modulation signal. The command value smoothing circuit smooths the pulse width modulation signal to generate a setting signal having the same period as that of the pulse width modulation signal. The deviation integrating circuit generates a detection signal having the same period as that of the pulse width modulation signal on the basis of the current caused to flow through the inductive load. The current controlling circuit controls the current caused to flow through the inductive load on the basis of the saw-tooth-wave signal and a deviation integration signal.

As a result, since the current control can be carried out only with a single period, it is possible to enhance the accuracy for the current control.

BRIEF DESCRIPTION OF THE DRAWINGS

The above and other objects as well as advantages of the present invention will become clear by the following description of the preferred embodiments of the present invention with reference to the accompanying drawings, wherein.

DESCRIPTION OF THE PREFERRED EMBODIMENTS

The preferred embodiments of the present invention will hereinafter be described in detail with reference to the accompanying drawings.

Embodiment 1

Figure 1:
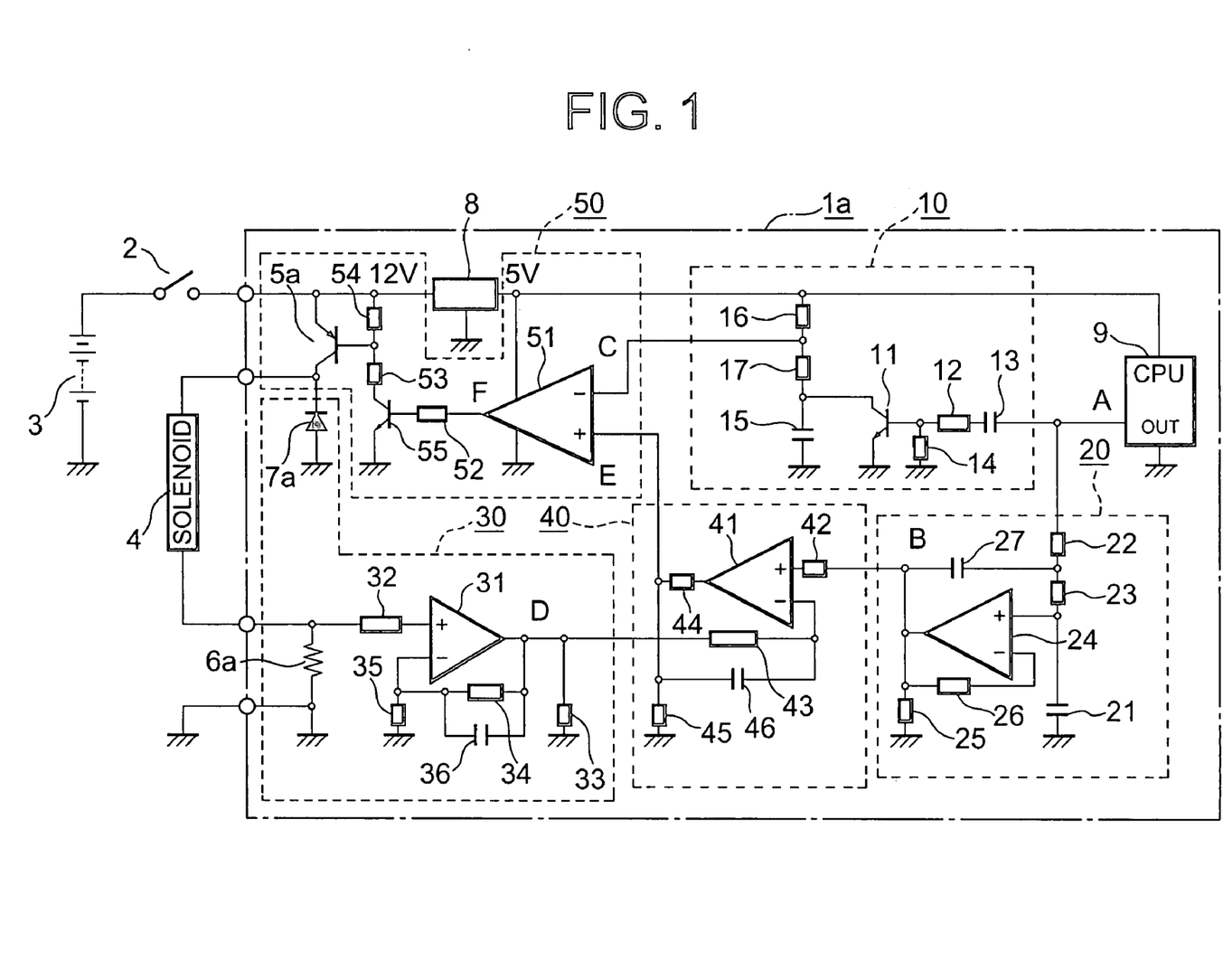
FIG. 1 is a circuit diagram showing a configuration of a current controller for an inductive load according to Embodiment 1 of the present invention.

A current controller for an inductive load according to Embodiment 1 of the present invention will hereinbelow be described in detail with reference to FIGS. 1 and 2. FIG. 1 is a circuit diagram showing a configuration of a current controller for an inductive load according to Embodiment 1 of the present invention. Incidentally, in the following description, in the figures, the same reference numerals designate the same portions or corresponding portions.

In FIG. 1, a current controller 1a is powered from a battery 3 through a power supply switch 2. Then, the current controller 1a turns ON/OFF a switch element 5a to thereby control a current caused to flow through a solenoid (inductive load) 4. The switch element 5a is composed of a PNP junction type bipolar transistor, or a P-channel field effect transistor, for example.

A power supply unit 8 is powered from the battery 3. The power supply unit 8 generates a regulated voltage for control (e.g., 12 V), and also supplies a predetermined voltage (e.g., D.C. 5 V) to a CPU (pulse width modulation signal outputting circuit) 9.

As shown in FIG. 1, the current controller 1a includes the CPU 9, a saw-tooth-wave signal generating circuit 10, a command value smoothing circuit 20, a detection value amplifying circuit 30, a deviation integrating circuit 40 and a current controlling circuit 50.

The CPU 9 is composed of a microprocessor and outputs a pulse width modulation signal A which is changed at a predetermined period. This pulse width modulation signal A is the signal for setting which the current caused to flow through the solenoid 4 to a target current. With the pulse width modulation signal A, the ratio (.÷T) of an ON time width . to a period T is set to a suitable value in the pulse width thereof to allow the current caused to flow through the solenoid 4 to be set to the target current because the target current is in proportion to the above-mentioned ratio.

Note that, the CPU 9, in addition to a function of controlling the current caused to flow through the solenoid 4, has also a function of driving an engine controller for an automobile, for example. As for functions of controlling an engine controller for an automobile, for example, there are the functions of controlling a quantity of supply of fuel to an engine and the function of controlling a speed change gear.

These functions are the functions which are operated in correspondence to the degree of working of an accel pedal or an automobile speed. In such a way, the CPU 9, as a partial function thereof, controls the current caused to flow through the solenoid 4.

The saw-tooth-wave signal generating circuit 10 has a transistor 11 adapted to be driven with the pulse width modulation signal A inputted from the CPU 9. The transistor 11 is operatively connected to the CPU 9 through a driving resistor 12 and a differential capacitor 13. A stabilizing resistor 14 is operatively connected between a base terminal and an emitter terminal of the transistor 11. A capacitor 15 is operatively connected between a collector terminal and the emitter terminal of the transistor 11. In addition, the capacitor 15 is also operatively connected to the CPU 9 through charging resistors 16 and 17. Note that, a resistance value of the charging resistor 17 is set to a much smaller value than that of the charging resistor 16.

The command value smoothing circuit 20 has a primary smoothing capacitor 21 which is powered with the pulse width modulation signal A from the CPU 9. The primary smoothing capacitor 21 is operatively connected to the CPU 9 through charging resistors 22 and 23.

In addition, the command value smoothing circuit 20 has an amplifier 24 for amplifying a voltage developed across opposite terminals of the primary smoothing capacitor 21. An output resistor 25 is operatively connected to an output terminal of the amplifier 24. A negative feedback resistor 26 is operatively connected between a negative side input terminal and an output terminal of the amplifier 24.

A secondary smoothing capacitor 27 is operatively connected to a node between the charging resistors 22 and 23, and is also operatively connected to the output terminal of the amplifier 24.

The detection value amplifying circuit 30 has an amplifier 31 for amplifying a voltage developed across opposite terminals of a current detecting resistor 6a used to detect the current caused to flow through the solenoid 4. An input resistor 32 is operatively connected to a positive side input terminal of the amplifier 31, and an output resistor 33 is operatively connected to an output terminal of the amplifier 31.

Negative feed back resistors 34 and 35 are operatively connected between the output terminal and the negative side input terminal of the amplifier 31. The amplifier 31 has a function of negatively feeding back a division voltage obtained through these negative feedback resistors 34 and 35. A smoothing capacitor (composed of semiconductor element) 36 is operatively connected between opposite terminals of the negative feedback resistor 34, and is also operatively connected between the negative side input terminal and the output terminal of the amplifier 31. The smoothing capacitor 36 has a function of smoothing an output voltage of the detection value amplifying circuit 30. A commutation diode (composed of semiconductor element) 7a is operatively connected to the solenoid 4.

The deviation integrating circuit 40 has a comparator 41, input resistors 42 and 43, output resistors 44 and 45, and an integrating capacitor 46. The input resistor 42 is operatively connected to a positive side input terminal of the comparator 41. On the other hand, both the input resistor 43 and the integrating capacitor 46 are operatively connected to a negative side input terminal of the comparator 41. Both the output resistors 44 and 45 are operatively connected to an output terminal of the comparator 41. Note that, each of resistance values of the output resistors 44 and 45 is set to a much smaller value than that of the input resistor 43.

The current controlling circuit 50 has a comparator 51, driving resistors 52 and 53, a stabilizing resistor 54, a transistor 55, and a switch element 5a. A saw-tooth-wave signal C is inputted to a negative side input terminal of the comparator 51, and a deviation integration signal E is inputted to a positive side input terminal of the comparator 51. On the other hand, a turn-ON/OFF signal F is outputted through an output terminal of the comparator 51.

The driving resistor 52 is the resistor used to drive the transistor 55, and the driving resistor 53 is the resistor used to cause the switch element 5a to conduct in order to drive the same. The stabilizing resistor 54 is operatively connected between a base terminal and an emitter terminal of the switch element 5a.

Next, an operation of the current controller 1a for an inductive load according to Embodiment 1 will be described hereinbelow with reference to FIGS. 1 and 2.

Figure 2:
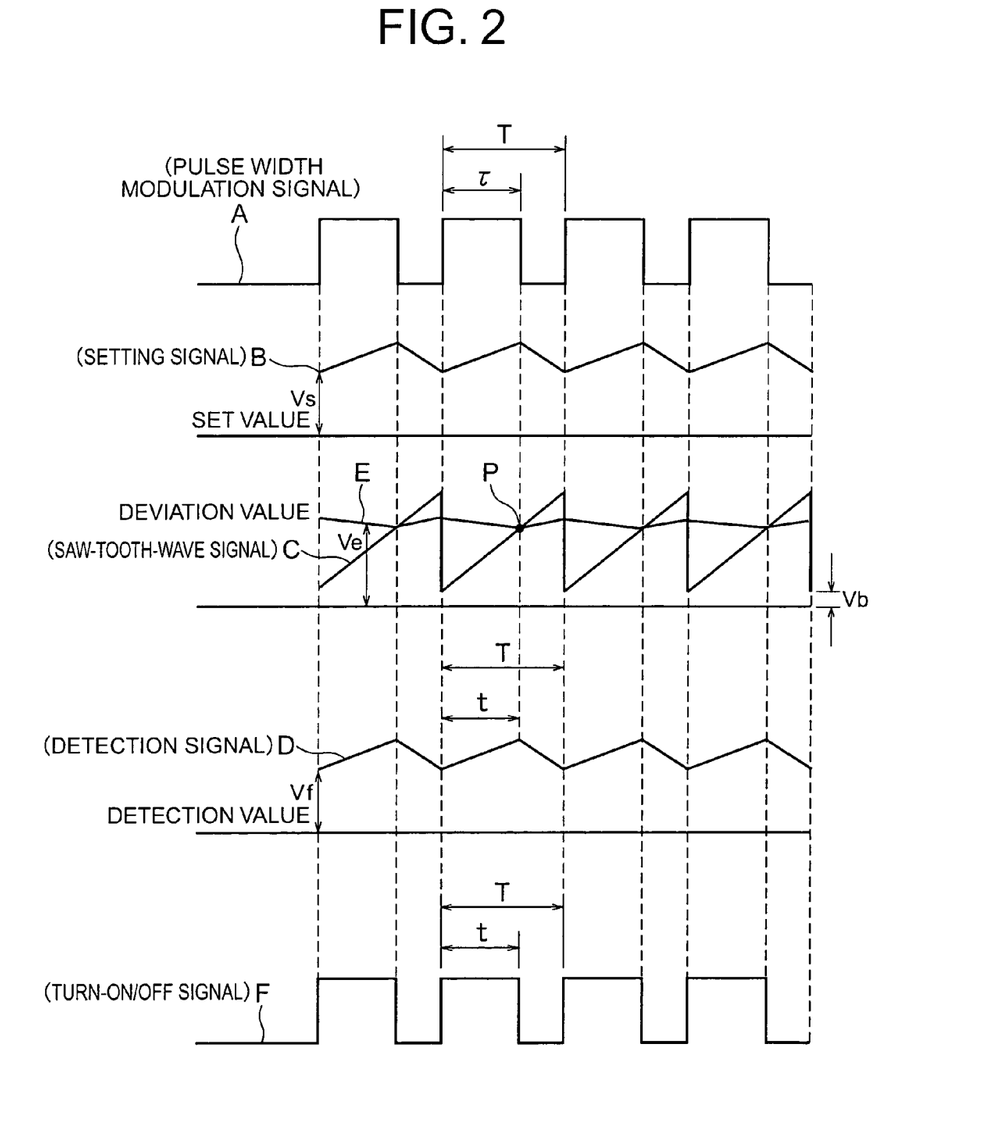
FIG. 2 is a timing chart for explaining the operation of the current controller for the inductive load according to Embodiment 1 of the present invention.

FIG. 2 is a timing chart useful in explaining the operation of the current controller for the inductive load according to Embodiment 1 of the present invention.

In FIG. 1, when the power supply switch 2 is in a turn-ON state and the switch element 5a of the current controlling circuit 50 is also in a turn-ON state, the current controller 1a controls the current caused to flow through the solenoid 4 in accordance with the following procedure. Note that, when the switch element 5a is in the turn-ON state, a predetermined driving current is caused to flow through the solenoid 4 via a series circuit consisting of the battery 3, the power supply switch 2, the switch element 5a, the solenoid 4, and the current detecting resistor 6a.

First of all, the pulse width modulation signal A generated from the CPU 9 is shown in FIG. 2. In FIG. 2, the pulse width modulation signal A is previously set so that the ratio $(\cdot \div T)$ of an ON-time width . to a period T is in proportion to a target current. Note that, the pulse width modulation signal A is changed at a period having a value smaller than an inductive time constant $(L \div R)$ as the ratio of an inductance L to an internal resistance value R of the solenoid 4.

Subsequently, the command value smoothing circuit 20 smooths the pulse width modulation signal A to generate a setting signal B having a period T.

In the command value smoothing circuit 20, when an output signal outputted through an output terminal OUT of the CPU 9 is at a level H (when the pulse width modulation signal A is in an ON-time period), the primary smoothing capacitor 21 is charged with electricity, while when the output signal is at a level L (the pulse width modulation signal A is in an OFF-time period), the electric charges accumulated in the primary smoothing capacitor 21 are discharged. As a result, a voltage developed across the primary smoothing capacitor 21 becomes a pulsating D.C. signal voltage the magnitude of which is nearly in proportion to the above-mentioned ratio $(\cdot \div T)$ of the pulse width modulation signal A.

On the other hand, in the command value smoothing circuit 20, when the output signal outputted through the output terminal OUT of the CPU 9 is at the level H, the secondary smoothing capacitor 27 is charged with electricity through the charging resistors 22 and 23, while when the output signal is at the level L, the primary smoothing capacitor 21 is charged with electricity. As a result, the voltage developed across the primary smoothing capacitor 21 is suppressed with rise and fall thereof to become a D.C. signal having a smaller pulsation component.

The above-mentioned setting signal B is shown in FIG. 2. In FIG. 2, the setting signal B becomes a setting signal voltage Vs component containing a minute pulsation component.

On the other hand, the saw-tooth-wave signal generating circuit 10 generates the saw-tooth-wave signal C having the same period T as that of the pulse width modulation signal A along with generation of the pulse width modulation signal A. This saw-tooth-wave signal C is shown in FIG. 2. In FIG. 2, the saw-tooth-wave signal C is the signal having the same period T as that of the pulse width modulation signal A. When generating the saw-tooth-wave signal C, the saw-tooth-wave signal generating circuit 10 is changed at a timing of a rise of a pulse of the pulse width modulation signal A. As a result, the operation of the saw-tooth-wave signal generating circuit 10 can be synchronized with the operation of the CPU 9 so that the operation of the current control is stabilized.

The detection value amplifying circuit 30 generates a detection signal D having the same period T as that of the pulse width modulation signal A on the basis of the current caused to flow through the solenoid 4. The detection signal D is shown in FIG. 2. In FIG. 2, the detection signal D becomes a D.C. voltage component having a pulsation component which is obtained by the smoothing operation of the inductance of the solenoid 4 and the smoothing capacitor 36. A voltage of this detection signal D is referred to as a detection signal voltage Vf.

In FIG. 1, in the detection value amplifying circuit 30, the pulsation component of the detection signal voltage Vf is suppressed by the smoothing capacitor 36. Moreover, the pulsation width modulation signal A is changed with a period having a smaller value than the inductive time constant (L÷R) as the ratio of the inductance L to the internal resistance R of the solenoid 4. This leads to that the current control for the solenoid 4 can be stably carried out.

The deviation integrating circuit 40 generates the deviation integration signal E corresponding to deviation integration of the setting signal B from the command value smoothing circuit 20 and the detection signal D from the detection value amplifying circuit 30. The deviation integration signal E is shown in FIG. 2. In FIG. 2, the deviation integration signal E becomes a D.C. voltage component which fluctuates before and after the ON-time width . of the pulse width modulation signal A. The deviation integration signal E is referred to as a deviation integration signal voltage Ve.

The deviation integration signal voltage Ve is calculated on the basis of the following Expression (1):

$$Ve = Vs + \int \{(Vs-Vf) \div RC\} dt \quad \text{(Expression 1)}$$

where Vs is the setting signal voltage, Vf is the detection signal voltage, R is the resistance value of the input resistor 43, and C is an electrostatic capacity of the integrating capacitor 46.

As apparent from Expression (1), the deviation integration signal E has the voltage components consisting of a deviation integration voltage expressed by a term of [.{Vs−Vf}÷RC}dt] of the setting signal B and the detection signal D, and the setting signal voltage Vs of the setting signal B. In other words, the setting signal voltage Ve has the setting voltage Vs as a fundamental component.

In Expression (1), the setting signal voltage Vs pulsates at the same period T as that of the pulse width modulation signal A. Moreover, the deviation voltage expressed by (Vs−Vf) also pulsates at the same period T as that of the pulse width modulation signal A because both the setting signal voltage Vs and the detection signal voltage Vf pulsate with the same period T as that of the pulse width modulation signal A. Thus, the deviation integration signal Ve is also changed at the same period T as that of the pulse width modulation signal A. As a result, it becomes possible to carry out the current control only with the single period T, and hence it becomes possible to stably carry out the current control even if the ratio between a turn-ON time period and a turn-OFF time period of the switch element 5a is changed. Furthermore, the high speed response becomes possible.

The current control circuit 50 receives as its inputs the saw-tooth-wave signal C from the saw-tooth-wave signal generating circuit 10 and the deviation integration signal E from the deviation integrating circuit 40. Then, in the current controlling circuit 50, the current caused to flow through the solenoid 4 is controlled with the switch element 5a in accordance with the results of a comparison between the saw-tooth-wave signal C and the deviation integration signal E.

In FIG. 1, in the current controlling circuit 50, the comparator 51 outputs a turn-ON/OFF signal F generated in accordance with the results of the comparison between the saw-tooth-wave signal C and the deviation integration signal E to the transistor 55. The turn-ON/OFF signal F is shown in FIG. 2. In FIG. 2, the turn-ON/OFF signal F is changed at the same period T as that of the pulse width modulation signal A and has an ON-time width t. The ON-time width t is determined on the basis of a position of a point P at which the saw-tooth-wave signal C and the deviation integration signal E intersect each other in FIG. 2.

Then, for the ON-time width t, the switch element 5a of the current controlling circuit 50 is held in a turn-ON state through the transistor 55. Then, the current is continued to be caused to flow through the solenoid 4. On the other hand, for an OFF-time width (T−t), the switch element 5a is held in a turn-OFF state through the transistor 55. Then, the current which has been continued to be caused to flow through the solenoid 4 circulates from the detection resistor 6a into the commutation diode 7a to be attenuated. As a result, since the pulsation component of the solenoid 4 is suppressed, the control for the current caused to flow through the solenoid 4 becomes easy to be stabilized. Note that, in FIG. 2, when the deviation integration voltage Ve is equal to or lower than a bias voltage Vb, the switch element 5a gets a normal turn-OFF state.

Hence, let us discus the operation of the current controller 1a with reference to the above-mentioned Expression (1) and FIG. 2. When in the above-mentioned Expression (1), for example, a state continues in which the setting signal voltage Vs is higher than the detection signal voltage Vf (when a relationship of Vs>Vf is held), the deviation integration voltage Ve is increased. Then, in FIG. 2, the position of the intersection P is moved to the right-hand side so that the ON-time width t of the turn-ON/OFF signal F is increased. As a result, the detection signal voltage Vf is increased, and hence its error is corrected.

On the other hand, when in the above-mentioned Expression (1), for example, a state continues in which the setting signal voltage Vs is lower than the detection signal voltage Vf (when a relationship of Vs<Vf is held), the deviation integration voltage Ve is decreased. Then, in FIG. 2, the position of the intersection P is moved to the left-hand side so that the ON-time width t of the turn-ON/OFF signal F is decreased. As a result, the detection signal voltage Vf is decreased, and hence its error is corrected.

In addition, when in the above-mentioned Expression (1), a value of the integration term of [.{Vs−Vf}÷RC}dt] is zero, in the deviation integration voltage Ve, the setting voltage Vs becomes the bias component voltage. For this reason, when the ON-time width .of the pulse width modulation signal A is made equal to the ON-time width t of the turn-ON/OFF signal F, the ON-time width t can be expressed as follows along with the voltage fluctuation of the battery 3 and the fluctuation of the internal resistance of the solenoid 4:

$$t = .+.t \quad \text{(Expression 2)}$$

where .t is a fluctuation time (error).

Thus, in FIG. 2, when the setting signal voltage Vs is increased step by step, for example, the ON-time width t of FIG. 2 is gradually increased to be converged. As a result, the ON-time width t is prevented from being unstably increased.

Moreover, when the setting signal voltage Vs is increased or decreased in accordance with a change in target current in Expression (1), the deviation integration signal voltage Ve is also immediately increased or decreased. Thus, the deviation integration signal voltage Ve is changed in a direction of following a change in target current. Moreover, since when the deviation voltage (Vs−Vf) is even slightly present in Expression (1), its deviation voltage is integrated, its error is corrected.

As described above, the current controller 1a includes: the pulse width modulation signal outputting circuit 9 for outputting the pulse width modulation signal A in accordance with which the current caused to flow through the inductive load 4 is set to the target current; the saw-tooth-wave signal generating circuit 10 for generating the saw-tooth-wave signal C having the same period T as that of the pulse width modulation signal A; the command value smoothing circuit 20 for smoothing the pulse width modulation signal A to generate the setting signal B having the same period T as that of the pulse width modulation signal A; the detection value amplifying circuit 30 for generating the detection signal D having the same period T as that of the pulse width modulation signal A on the basis of the current caused to flow through the inductive load 4; the deviation integrating circuit 40 for generating the deviation integration signal E corresponding to the deviation integration of the setting signal B and the detection signal D; and the current controlling circuit 50 for controlling the current caused to flow through the inductive load 4 on the basis of the saw-tooth-wave signal C and the deviation integration signal E.

With this configuration, in the current controlling circuit 50, the current caused to flow through the solenoid 4 is controlled with the switch element 5a in accordance with the results of a comparison between the saw-tooth-wave signal C having the period T and the deviation integration signal E having the period T. As a result, the current control can be carried out only with the single period T, and a fixed current can be usually caused to flow through the solenoid 4 against a change of the ratio between the turn-ON time and the turn-OFF time of the switch element 5a. In addition, the high speed response can be made possible. Moreover, the current controller 1a is free from an influence by a temperature change of the solenoid 4.

Furthermore, since the current caused to flow through the solenoid 4 can be freely changed only with the single pulse width modulation signal A, a configuration of the hardware of the current controller 1a can be relatively simplified.

Embodiment 2

Figure 3:
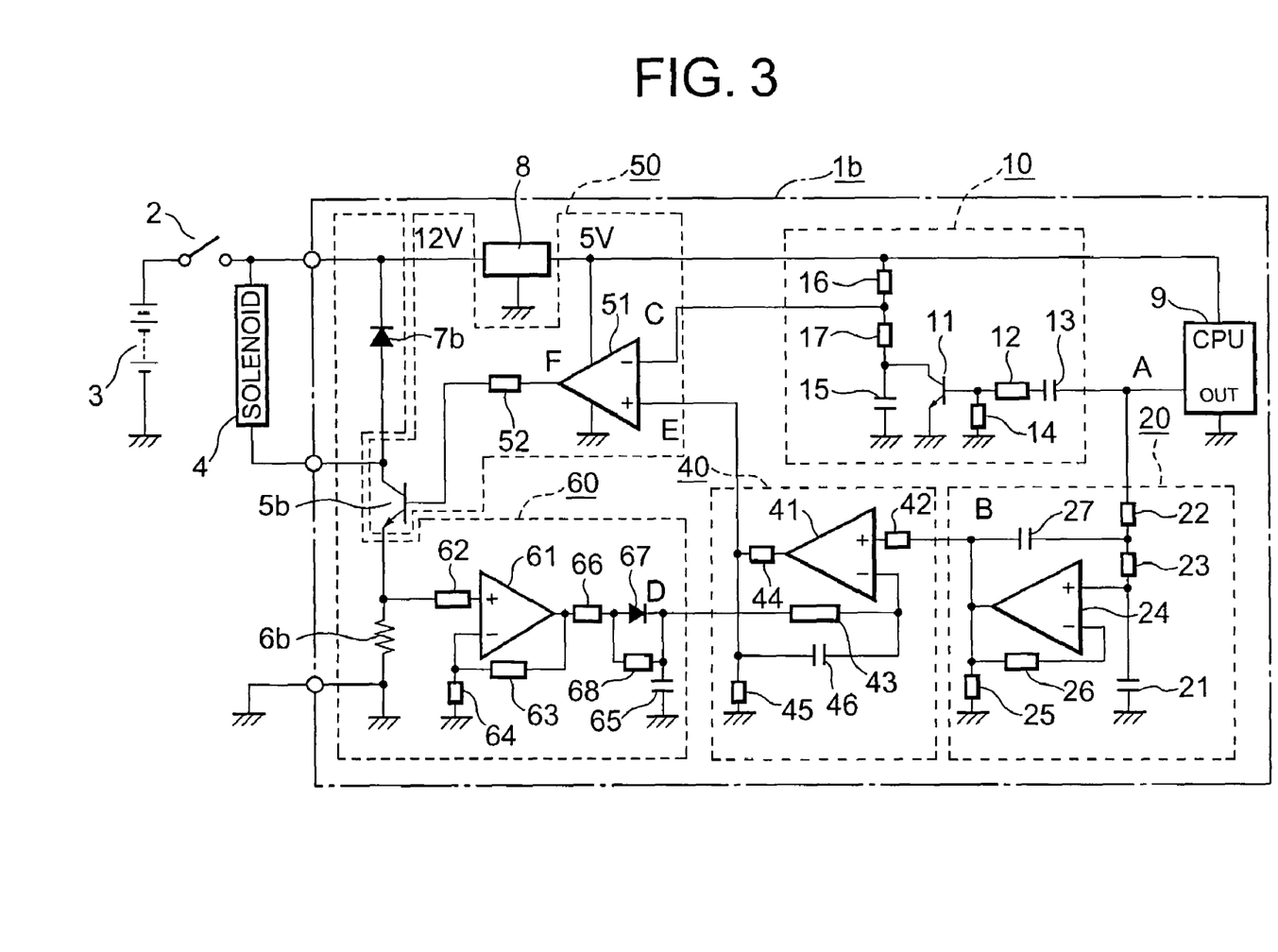
FIG. 3 is a circuit diagram showing a configuration of a current controller for an inductive load according to Embodiment 2 of the present invention.

A current controller for an inductive load according to Embodiment 2 of the present invention will hereinbelow be described in detail with reference to FIG. 3. FIG. 3 is a circuit diagram showing a configuration of a current controller 1b for an inductive load according to Embodiment 2 of the present invention. Incidentally, the repeated description of portions designated with the same reference numerals as those of the above-mentioned Embodiment 1 are suitably omitted here.

In FIG. 3, the current controller 1b is provided with a detection value amplifying circuit 60 instead of the detection value amplifying circuit 30 of the above-mentioned current controller 1a. In addition, the current controller 1b is provided with a switch element 5b and a commutation diode 7b instead of the switch 5a and the commutation diode 7a of the above-mentioned current controller 1a. The switch element 5b is composed of an NPN junction type bipolar transistor or an N-channel field effect transistor, for example. Other configurations are nearly the same as those of the above-mentioned Embodiment 1.

The detection value amplifying circuit 60 has an amplifier 61, an input resistor 62, and negative feedback resistors 63 and 64. A voltage obtained through the voltage division by the negative feedback resistors 63 and 64 is negatively fed back to the amplifier 61. In addition, the detection value amplifying circuit 60 has a smoothing capacitor 65, a charging resistor 66, a diode 67, and a discharging resistor 68. The smoothing capacitor 65 is charged with electricity originated from the electric charges supplied through an output terminal of the amplifier 61 via the charging resistor 66 and the diode 67. The discharging resistor 68 is operatively connected in parallel with the diode 67. The discharging resistor 68 has a function of, when a voltage appearing at the output terminal of the amplifier 61 is 0 V, discharging the electric charges accumulated in the smoothing capacitor 65. Incidentally, the charging resistor 66 has a function of, when the switch element 5b is turned ON or turned OFF, reducing a pulsation component of the detection signal voltage Vs.

Note that, a discharge smoothing time constant (R×C) of a resistance value R of the discharging resistor 68 and an electrostatic capacity C of the smoothing capacitor 65 is set equal to the inductive time constant (L÷R) as the ratio of the inductance L to the internal resistance R of the solenoid 4. The equality means the same or the similarity, and so forth.

In FIG. 3, in the command value smoothing circuit 20, the primary smoothing capacitor 21 and the secondary smoothing capacitor 27 have a function of carrying out the higher order smoothing as compared with the smoothing based on the smoothing time constant (R1×C) as a product of a resistance value R1 of the discharging resistor 68 and an electrostatic capacity C of the smoothing capacitor 65. With this configuration, the setting signal B has the same smoothing characteristics as those of the detection signal D. Thus, a pulsation component of the deviation signal voltage Ve is reduced. As a result, it becomes possible that the current controller 1b stably carries out the current control, and also makes the transient current response speedy.

Next, the operation of the current controller 1b for an inductive load according to Embodiment 2 will hereinbelow be described in detail with reference to FIG. 3.

In FIG. 3, when the power supply switch 2 is in a turn-ON state, and the switch element 5b of the current controlling circuit 50 is also in a turn-ON state, the current controller 1b carries out the current control for the solenoid 4 in accordance with the following procedure.

In FIG. 3, the CPU 9, the saw-tooth-wave signal generating circuit 10, the command value smoothing circuit 20, the detection value amplifying circuit 60, the deviation integrating circuit 40, and the current controlling circuit 50 are operated nearly in the same manner as that in the above-mentioned Embodiment 1. In other words, the current controller 1b turns ON/OFF the switch element 5b to thereby control the current caused to flow through the solenoid (inductive load) 4.

In FIG. 3, upon turn-ON of the switch element 5b, a predetermined driving current is caused to flow through the solenoid 4 via a series circuit consisting of the battery 3, the power supply switch 2, the solenoid 4, the switch element 5b and the current detecting resistor 6b.

In the detection value amplifying circuit 60, when the switch element 5b is in the turn-ON state, the smoothing capacitor 65 is charged with electricity originated from the electric charged supplied through an output terminal of the amplifier 61 via the charging resistor 66 and the diode 67.

On the other hand, upon turn-OFF of the switch element 5b, the current which is continued to be caused to flow through the solenoid 4 circulates through the commutation diode 7b to be attenuated. Then, no current is caused to flow through the detection resistor 6b. As a result, since a pulsation component of the solenoid 4 is suppressed, the current control for the solenoid 4 becomes easy to be stabilized.

In the detection value amplifying circuit 60, when the switch element 5b is in the turn-OFF state, the voltage developed across the smoothing capacitor 65 is attenuated in accordance with the same attenuation characteristics as those in accordance with which the current caused to flow through the solenoid 4 is attenuated through the commutation diode 7b. This reason is that a discharge time constant (a product of the resistance value R of the discharging resistor 68 and the electrostatic capacity C of the smoothing capacitor 65) is set to the value equal to an inductive time constant (a quotient of the inductance L of the solenoid 4 by the internal resistance R of the solenoid 4). As a result, since the pulsation component of the solenoid 4 is suppressed, the current control for the solenoid 4 becomes easy to be stabilized. Moreover, during the charge/discharge of the smoothing capacitor 65, the pulsation component of the solenoid 4 is suppressed all the more since the influence of the smoothing time constant (R1×C) as a product of the resistance value R1 of the charging resistor 66 and the electrostatic capacity C of the smoothing capacitor 65 is exerted on the pulsation component thereof. This is also applied to the above-mentioned Embodiment 1.

Note that, in FIG. 3, the discharging resistor 68 may be operatively connected in parallel with a series circuit consisting of the charging resistor 66 and the diode 67. In this case, the resistance value of the charging resistor in the above-mentioned smoothing time constant is the resistance value of a combined resistor of the discharging resistor 68 and the charging resistor 66.

In such a manner, at the time when the detection value amplifying circuit 60 has outputted the detection signal D shown in FIG. 2 to the deviation integrating circuit 40, the switch element 5b is turned ON/OFF to thereby suppress the current caused to flow through the solenoid 4. Consequently, the same effects as those of the above-mentioned Embodiment 1 are obtained.

Moreover, in this Embodiment 2, an NPN junction type bipolar transistor or an N-channel field effect transistor is prepared as the switch element 5b. Thus, the current controller 1b can be made lower in cost and also can have a more simplified configuration as compared with the case where an PNP junction type bipolar transistor or a P-channel field effect transistor is prepared as the switch element 5b.

In addition, in this Embodiment 2, the detection value amplifying circuit 60 has a smoothing capacitor 65 which, upon turn-ON of the switch element 5b, is charged with electricity originated from the electric charges supplied through the charging resistor 66, and upon turn-OFF of the switch element 5b, discharges the electric charges accumulated therein through the discharging resistor 68. Then, the discharge time constant (R×C) is set to the value equal to the inductive time constant (L÷R). Consequently, the detection signal voltage Vf can be accurately detected in correspondence to the current caused to flow through the solenoid 4.

Embodiment 3

Figure 4:
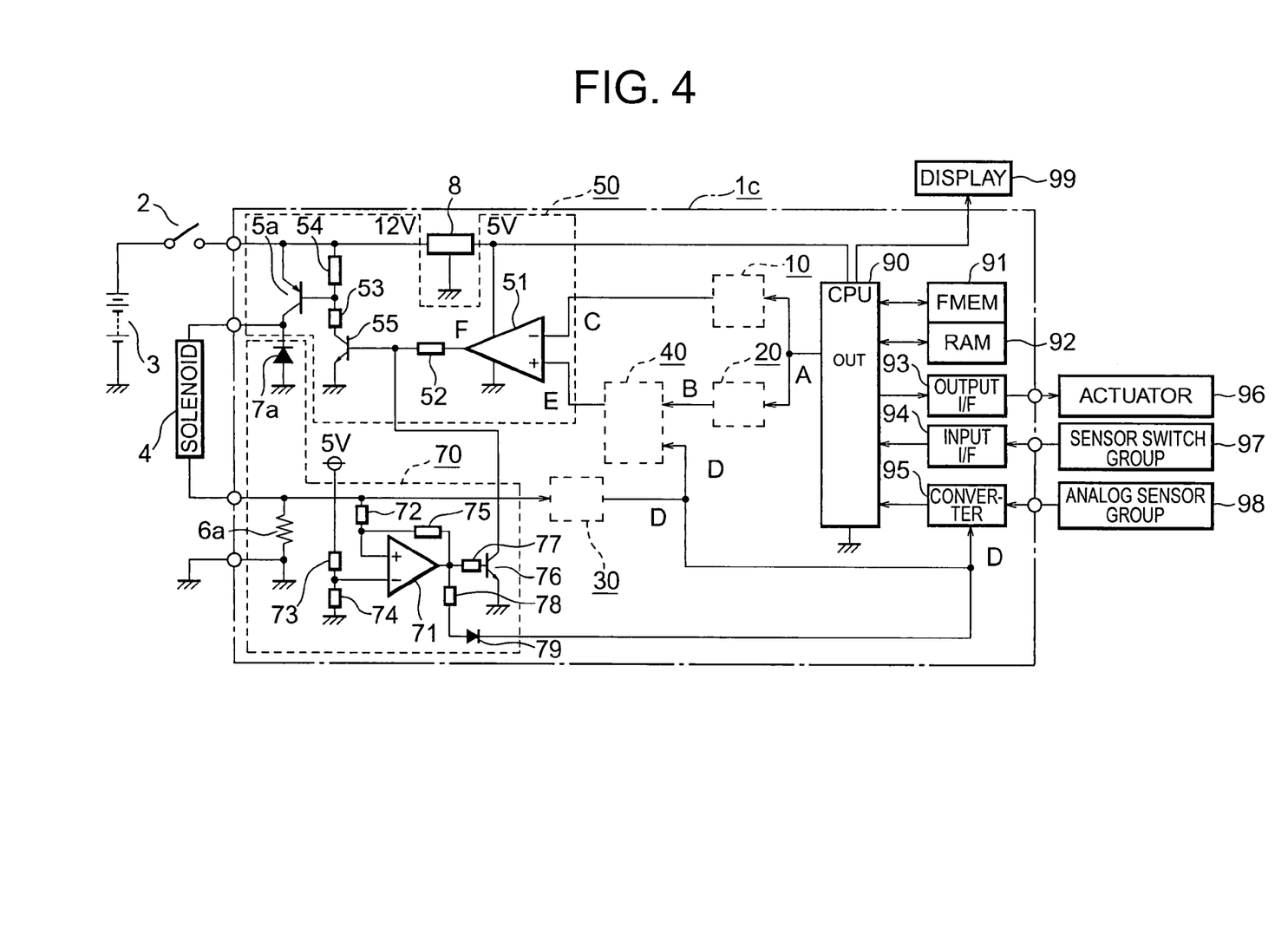
FIG. 4 is a circuit diagram, partly in block diagram, showing a configuration of a current controller for an inductive load according to Embodiment 3 of the present invention.

A current controller for an inductive load according to an embodiment 3 of the present invention will hereinbelow be described in detail with reference to FIG. 4. FIG. 4 is a circuit diagram, partly in block diagram, showing a configuration of a current controller 1c for an inductive load according to Embodiment 3 of the present invention. Incidentally, the repeated description of portions designated with the same reference numerals as those in Embodiment 1 is suitably omitted here.

In FIG. 4, the current controller 1c includes an overload protecting circuit 70. In addition, the current controller 1c includes a CPU (processing means) 90, a program memory (memory device) 91, a memory for processing of arithmetic operations (memory device) 92, an output interface circuit 93, an input interface circuit 94, and a converter 95. Other configurations are the same as those of the above-mentioned Embodiment 1.

The overload protecting circuit 70 has a comparator 71, an input resistor 72, voltage division resistors 73 and 74, a positive feedback resistor 75, a transistor 76, a driving resistor 77, an addition resistor 78, and a diode 79. A voltage developed across the current detecting resistor 6a is applied to a positive side input terminal of the comparator 71 through the input resistor 72. On the other hand, a predetermined voltage (e.g., 5 V) is applied to a negative side input terminal of the comparator 71 through the voltage division resistors 73 and 74. The positive feed back resistor 75 is operatively connected to both an output terminal and the positive side input terminal of the comparator 71. The transistor 76 has a function of being caused to conduct to be driven through the driving resistor 77 with an output voltage of the comparator 71. A collector terminal of the transistor 76 is operatively connected to a base terminal of the transistor 51. The addition resistor 78 is operatively connected in series with the diode 79 and is also operatively connected to the output terminal of the comparator 71. The diode 79 is operatively connected to the converter 95.

A monitoring program for monitoring a state of control for the current caused to flow through the solenoid 4 is stored in the program memory 91. In FIG. 4, a word of FMEM is an abbreviated word of a flash memory. The above-mentioned monitoring program is the program for monitoring whether or not the current control for the solenoid 4 is properly carried out from the results of a comparison between the target current of the solenoid 4 which is set with the above-mentioned pulse width modulation signal A and the flowing current of the solenoid based on the detection signal D which is obtained through the conversion by the converter 95. The flowing current of the solenoid 4 (the current which is actually caused to flow through the solenoid 4) is calculated on the basis of the resistance value of the current detecting resistor 6a, and the like. In addition, whether or not the current control for the solenoid 4 is properly carried out, for example, is judged from a viewpoint of whether or not the value of the results of the comparison falls within an allowable range. The allowable range, for example, is calculated on the basis of the circuit configuration of the current controller 1c and the factors of the target current of the solenoid 4 and the like.

The memory 92 for processing of arithmetic operations is composed of a RAM, for example. The converter 95 is composed of a multiple channel converter for converting an analog signal into a digital signal. The actuator 96 is composed of an on-board electrical load group. For example, an electromagnetic valve for fuel injection, an ignition coil, an electromagnetic valve for speed stage change of a speed change gear, and the like are correspond to the on-board electrical load group.

The sensor switch 97 is composed of a switch group for use in a rotation sensor of an engine, an angle sensor of a crank, an automobile speed sensor and the like, for example. The analog sensor 98 is composed of an analog sensor group consisting of an accel sensor, a throttle sensor, an air flow sensor and the like, for example. The accel sensor is the sensor for detecting the degree of working of an accel pedal. The throttle sensor is the sensor for detecting the valve aperture of a throttle. Also, the air flow sensor is the sensor for measuring a quantity of intake air.

The CPU 90 controls the driving of the actuator 96 in accordance with a quantity of change in a sensor output signal inputted from the sensor switch 97, and in a digital output signal of the analog sensor 98 obtained through the digital conversion by the converter 95. In addition, the CPU 90 includes the CPU (pulse width modulation signal generating circuit) 9 of the current controller 1a. Thus, the current control for the solenoid 4 and the driving control for the actuator 96 can be carried out by the single CPU 90. As a result, the current controller 1c can be made low in cost and can also be miniaturized with a configuration thereof.

Next, the operation of the current controller 1c according to this Embodiment 3 will hereinbelow be described in detail with reference to FIG. 4.

The operation for monitoring a state of the current control will now be described on the assumption that in FIG. 4, the current controller 1c carries out the current control for the solenoid 4 in accordance with the same procedure as that in the above-mentioned Embodiment 1.

In FIG. 4, the detection value amplifying circuit 30 outputs the detection signal D to both the deviation integrating circuit 40 and the converter 95. Then, the converter 95 converts the detection signal D to a digital signal to output the resultant digital detection signal D to the CPU 90.

The CPU 90 makes a comparison between the target current of the solenoid 4 which is set with the pulse width modulation signal A and the flowing current of the solenoid 4 based on the digital detection signal D obtained through the digital conversion by the converter 95 in accordance with the monitoring program stored in the program memory 91. Then, the CPU 90, on the basis of the above-mentioned comparison results, monitors a state of control for the current caused to flow through the solenoid 4 in accordance with the above-mentioned monitoring program to output data exhibiting the monitoring situation to the display device (output unit) 99. As for the monitoring situation, for example, there are operation normality and operation abnormality. Note that, in the case where disconnection occurs in the solenoid 4 or any of wirings, the CPU 90 can not detect the detection signal voltage Vf even though it generates the pulse width modulation signal A. Thus, in this case, the CPU 90 outputs data exhibiting the effect that the operation is in an abnormal state to the display device 99. As a result, the disconnection of the solenoid 4 or any of the wirings can also be detected.

Note that, the CPU 90 may output as the monitoring situation data exhibiting temperature abnormality of the solenoid 4 to the display device 99. In this case, data exhibiting correspondence between the resistance values of the solenoid 4 and the allowable temperature is stored in the memory for processing of arithmetic operations (memory device) 92. The CPU 90 receives as its input a voltage of the battery 3 which has been obtained through the digital conversion by the converter 95 to refer to the correspondence therebetween stored in the memory for processing of arithmetic operations 92 on the basis of the voltage from the battery 3 to thereby judge whether or not a temperature of the solenoid 4 is proper. For example, the CPU 90 calculates a resistance value of the solenoid 4 from the voltage of the battery 3 on the basis of the circuit configuration. Then, when the CPU judges that a temperature of the solenoid 4 is inproper, it outputs data exhibiting the temperature abnormality of the solenoid 4 to the display device 99.

As described above, the current controller 1c further includes: the converter 95 for converting a voltage of the detection signal B into a digital signal; the memory means (program memory) 91 for storing therein the monitoring program for monitoring a state of control for a current caused to flow through the inductive load 4; and the processing means (CPU) 90 for making a comparison between a target current of the inductive load 4 which is set with the pulse width modulation signal generated by the pulse width modulation signal generating circuit (CPU) 9 and the flowing current of the inductive load 4 based on the detection signal D which is obtained through the conversion by the converter 95 in accordance with the monitoring program, and for monitoring a state of control for a current caused to flow through the inductive load 4 in accordance with the monitoring program to output data exhibiting a monitoring situation to the output unit (display device) 99.

With the above-mentioned configuration, since the CPU 90 monitors a state of control for a current caused to flow through the solenoid 4, the current controller 1c can enhance the safety for the current control for the solenoid 4. For example, an accident due to a failure or the like can be prevented in advance.

Furthermore, in FIG. 4, when the overload protecting circuit 70 detects abnormality of the solenoid 4, it cuts off conduction of the switch element 5a and then outputs the detection signal voltage in this case to the CPU 90. As for the abnormality of the solenoid 4, for example, there are short-circuit of the solenoid 4, and the like.

When abnormality of the solenoid 4 is detected, in the overload protecting circuit 70, an output voltage of the comparator 71 goes a level H. Moreover, a state in which the output voltage of the comparator 71 is at the level H is held by the positive feedback resistor 75. Thus, since the transistor 76 becomes the conduction state and hence the transistor 55 becomes the nonconducting state, the switch element 5a is turned OFF. As a result, the switch element 5a can be prevented from being burnt.

On the other hand, when abnormality of the solenoid 4 is detected, the converter 95 receives as its input the detection signal D in that case from the overload protecting circuit 70 through the addition resistor 78 and the diode 79. The detection signal voltage Vf of the detection signal D thus inputted exceeds a fixed allowable value because the detection signal D is inputted through the addition resistor 78 and the diode 79.

Subsequently, the CPU 90 outputs data exhibiting the effect that abnormality has occurred in the solenoid 4 to the display device 99 on the basis of the detection signal voltage Vf of the digital detection signal D obtained through the digital conversion by the converter 95. As a result, the current controller 1c can make a user recognize abnormality such as an overload state of the solenoid 4. Moreover, in this Embodiment 3, at the time when abnormality has occurred in the solenoid 4, the switch element 5a is turned ON by the function of the overload protecting circuit 70. Thus, since the switch element 5a is protected by an external circuit of the CPU 90, a load with which the CPU 90 is burdened is lightened.

Note that, in the above-mentioned Embodiment 1 or 2, the saw-tooth-wave signal C has been described with respect to the case where as shown in FIG. 2, after the signal C has been gradually increased in its waveform, it is abruptly decreased. However, the saw-tooth-wave signal C may be gradually decreased in its waveform after having been abruptly increased. In this case as well, the same effects as those of the above-mentioned Embodiment 1 or 2 can be obtained. In this case, when a voltage of the saw-tooth-wave signal is higher than the detection integration signal voltage Ve, the switch element 5a or 5b is turned OFF. On the other hand, when the voltage of the saw-tooth-wave signal is lower than the detection integration signal voltage Ve, the switch element 5a or 5b is turned ON.

In addition, in the above-mentioned Embodiment 1 or 2, the deviation integration signal generating circuit 40 may generate the deviation integration signal voltage Ve in accordance with the following Expression (3). In this case as well, the same effects as those of the above-mentioned Embodiment 1 or 2 can be obtained.

$$Ve = Vs + [\cdot\{(Vf - Vs) \div RC\} dt] \quad \text{(Expression 3)}$$

where Vs is the setting signal voltage, Vf is the detection signal voltage, R is the resistance value of the input resistor 43, and C is the electrostatic capacity of the integrating capacitor 46.

In this case, when the voltage of the saw-tooth-wave signal is lower than the deviation integration signal voltage Ve, the switch element 5a or 5b is turned OFF. On the other hand, when the voltage of the saw-tooth-wave signal is higher than the deviation integration signal voltage Ve, the switch element 5a or 5b is turned ON.

While the present invention has been particularly shown and described with reference to the preferred embodiments and the specified changes thereof, it will be understood that other changes and the various modifications will occur to those skilled in the art without departing from the scope and true spirit of the invention. The scope of the invention is, therefore, to be determined solely by the appended claims.

What is claimed is:

1. A current controller for an inductive load, comprising:
   a pulse width modulation signal outputting circuit for outputting a pulse width modulation signal for setting a current caused to flow through the inductive load to a target current;
   a saw-tooth-wave signal generating circuit for generating a saw-tooth-wave signal having the same period as that of the pulse width modulation signal;
   a command value smoothing circuit for smoothing the pulse width modulation signal to generate a setting signal having the same period as that of the pulse width modulation signal;
   a detection value amplifying circuit for generating a detection signal having the same period as that of the pulse width modulation signal on the basis of the current caused to flow through the inductive load;
   a deviation integrating circuit for generating a deviation integration signal corresponding to deviation integration of the setting signal and the detection signal; and
   a current controlling circuit for controlling the current caused to flow through the inductive load on the basis of the saw-tooth-wave signal and the deviation integration signal.

2. A current controller for an inductive load according to claim 1, wherein the saw-tooth-wave signal generating circuit is operated at a timing of a rise of a pulse of the pulse width modulation signal.

3. A current controller for an inductive load according to claim 1, wherein the deviation integration signal has a voltage component containing the setting voltage of the setting signal, and the deviation integration voltage of the setting signal and the detection signal.

4. A current controller for an inductive load according to claim 1 wherein the pulse width modulation signal is operated with a period having a value smaller than an inductive time constant as the ratio of an inductance to an internal resistance of the inductive load, and the detection value amplifying circuit has a semiconductor element for suppressing a pulsation component of the current caused to flow through the inductive load.

5. A current controller for an inductive load according to claim 1, wherein the detection value amplifying circuit has a smoothing capacitor which is charged with electricity through a charging resistor when the switch element is turned ON, and the electric charges accumulated in which are discharged through a discharging resistor when a switch element is turned OFF, and wherein
   a discharge time constant as a product of a resistance value of the charging resistor and an electrostatic capacity of the smoothing capacitor is set to a value equal to the inductive time constant.

6. A current controller for an inductive load according to claim 1, wherein the setting signal has the smoothing characteristics equal to those of the detection signal.

7. A current controller for an inductive load according to claim 1, further comprising:
   a converter for digital converting a voltage of the detection signal;
   memory means for storing therein a monitoring program for monitoring a state of control for the current caused to flow through the inductive load; and
   processing means for making a comparison between a target current of the inductive load which is set with the pulse width modulation signal generated by the pulse width modulation signal outputting circuit and a flowing current of the inductive load based on the digital detection signal the converted by the converter in accordance with the monitoring program, and for monitoring a state of control for the current caused to flow through the inductive load on the basis of the comparison results and in accordance with the monitoring program to output monitoring situation to an output unit.

8. A current controller for an inductive load according to claim 7, further comprising overload protecting means for, cutting off conduction of the switch element when an abnormality of the inductive load is detected, and outputting the detection signal in that case to the processing means, wherein the processing means, on the basis of the detection signal outputted by the overload protecting means, further to the output unit in fact that the abnormality occurred.

9. A current controller for an inductive load according to claim 7, wherein the processing means includes the pulse width modulation signal outputting circuit.

* * * * *